United States Patent [19]

Hattis et al.

[11] 4,213,687

[45] Jul. 22, 1980

[54] FILM ADVANCING MECHANISM

[75] Inventors: Russell E. Hattis, Highland Park, Ill.; Chan K. Yan, Hong Kong, Hong Kong

[73] Assignee: W. Haking Enterprises Limited, Hong Kong

[21] Appl. No.: 923,373

[22] Filed: Jul. 10, 1978

[51] Int. Cl.² .............................................. G03B 1/00
[52] U.S. Cl. .................................................... 354/213
[58] Field of Search ............... 354/187, 206, 212, 213, 354/217

[56] References Cited

U.S. PATENT DOCUMENTS

| | | | |
|---|---|---|---|
| 3,696,723 | 10/1972 | Ernisse | 354/213 X |
| 3,918,074 | 11/1975 | Hackenberg et al. | 354/213 |
| 3,968,509 | 7/1976 | Winkler et al. | 354/213 |
| 3,995,292 | 11/1976 | Kondo et al. | 354/213 X |
| 3,999,199 | 12/1976 | Beach | 354/213 |
| 4,032,940 | 6/1977 | Chan | 354/219 |
| 4,104,664 | 8/1978 | Winkler et al. | 354/187 X |

Primary Examiner—L. T. Hix
Assistant Examiner—Thomas H. Tarcza
Attorney, Agent, or Firm—Wallenstein, Spangenberg, Hattis & Strampel

[57] ABSTRACT

A film advancing mechanism comprises a planetary gear train including preferably an annular film winding gear having internal teeth meshing with an eccentrically mounted gear carried by a drive gear which rotates in one direction and the other as a manually operable film winding member is moved back and forth. A sun gear carried by a rotatable slip clutch-forming member meshes with the eccentric gear. The slip clutch-forming member forms a slip clutch with a ratchet wheel held against rotation in one direction by a locking pawl so that the sun gear is normally locked against rotation when the film winding member is moved in the winding direction. When the sun gear is locked in position, bodily movement of the eccentrically mounted gear on the drive gear drives the annular film winding gear. When a film metering pawl enters a metering aperture of the film, a pawl locks the annular gear against further rotation. When the annular gear is so locked by the pawl or by the film unwinding completely from its supply spool, the sun gear-carrying member can slip or move with respect to the ratchet wheel, so that continued movement of the manually operable film winding member can take place.

8 Claims, 7 Drawing Figures

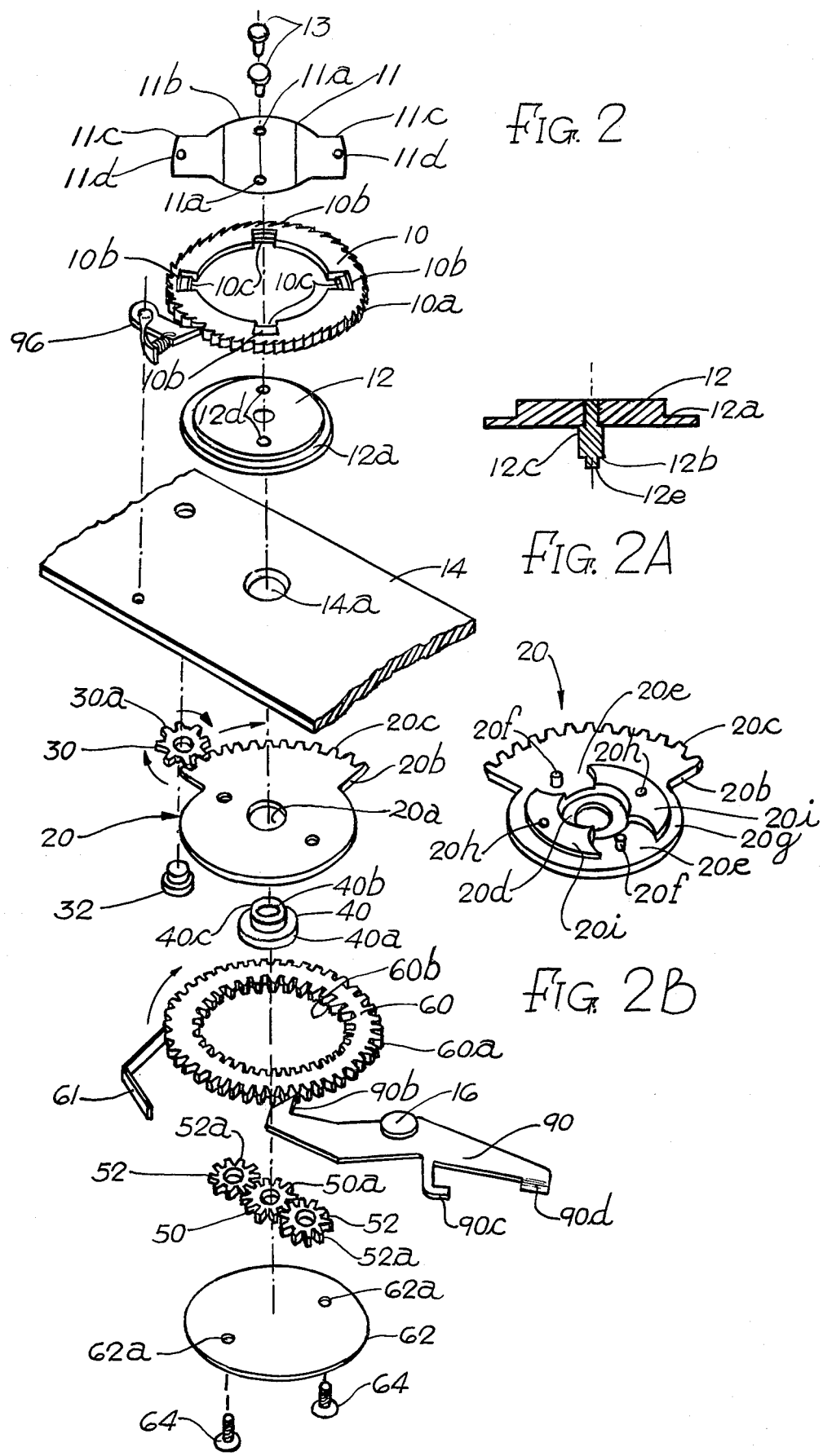

FILM ADVANCING MECHANISM

BACKGROUND AND SUMMARY OF INVENTION

The present invention relates to improvements in film advancing or winding mechanisms having utility in still cameras for advancing the roll film used in such cameras by the length of one frame between successive exposures of the film, and is an improvement over the film winding mechanism disclosed in U.S. Pat. No. 4,032,940.

The film advancing mechanism is shown in this patent as part of a pocket size retractable camera made in two sections, one being a main camera section including all of the operating elements of the camera except for the viewfinder carrying section thereof. The viewfinder carrying section forms a separate section mounted on the end of the main camera section for sliding movement between a retracted inoperative position and an extended operative position. The viewfinder carrying section of the camera is coupled to the film advancing mechanism of the camera which enables film advance to take place only when the viewfinder carrying section is moved to its extended, operative position. Shutter cocking occurs during the retraction of the viewfinder carrying section to its inoperative position. The viewfinder carrying section of the camera also is provided with means for removing a film sensing pawl or finger from a metering aperture in the film when the viewfinder carrying section is moved to its retracted position. Film advance occurs during movement of the viewfinder carrying section to its extended position when the film metering pawl is removed from the film metering aperture of the film.

The film winding mechanism disclosed in this patent includes a planetary gear mechanism, which permits the reciprocable viewfinder carrying section of the camera housing to be moved fully to its extended position after the film metering pawl enters a film aperture to terminate a film winding operation. To this end, the planetary gear mechanism disclosed in this patent includes a sun gear carried by the center portion of a ratchet wheel which is normally held in place by a locking pawl. The sun gear meshes with at least one eccentric gear carried by a drive gear which moves in one direction or the other, depending upon the direction of movement of the viewfinder carrying section of the camera. When the ratchet wheel is locked in place, the extended movement of the viewfinder carrying section of the camera imparts rotation to the drive gear which, in turn, bodily rotates the eccentric gear carried thereby, which drivingly engages the inner gear teeth of an annular film winding gear to effect a film winding operation. When the film metering pawl enters the film aperture and the film moves the metering pawl a small distance, this effects the release of a locking pawl from the ratchet wheel so that the sun gear carried thereby is free to rotate. The free rotation of the sun gear effectively decouples the bodily movement of the eccentric gear from driving action with the annular film winding gear, so that the viewfinder section can be moved to its fully extended position and then returned to its initial retracted position where shutter cocking and other operations can be carried out. To avoid tearing of the film when the film is completely unwound from the supply spool, the drive gear forms part of a slip clutch which enables the viewfinder section to be moved fully between its extreme positions even when the annular gear and the sun gear carrying ratchet wheel are locked against rotation.

The present invention represents a re-design and simplification of this planetary gear and film winding mechanism which reduces the number of parts therein. The slip clutch mechanism heretofore used is replaced by a much simpler one comprising a sun gear-carrying member and a ratchet wheel continuously held against rotation in one direction and forming a friction slip clutch with the latter member. Film winding is terminated by a locking pawl positively locking the aforesaid annular gear. In accordance with preferred specific aspects of the invention, the sun gear is carried by a rotatable member which confronts the ratchet wheel. The sun gear-carrying member preferably has or is connected to a member with projecting portions adapted to enter and normally be held by locking recesses formed in an axial face of the ratchet wheel. These projecting means can slip out of the recesses of the ratchet wheel when the annular gear is locked against rotation. When the viewfinder section of the camera is retracted and the drive gear carrying the eccentric gear is bodily rotated thereby, the sun gear and slip clutch-forming member carrying the same is rotated to bring the aforesaid projecting means once again into the locking recesses in the ratchet wheel which is free to rotate, because the aforesaid locking pawl permits such rotation in one direction.

The above and other features and advantages of the invention will become apparent upon making reference to the specification to follow when taken in conjunction with the accompanying drawings.

DESCRIPTION OF DRAWINGS

FIG. 2 is an enlarged exploded view of the components of said embodiment of the film advancing mechanism;

FIG. 2A is a sectional view through the sun gear-carrying member shown in FIG. 2.

FIG. 2B is a perspective view of the other side of one of the gears shown in FIG. 2;

DESCRIPTION OF EXEMPLARY EMBODIMENT OF THE INVENTION

Figure 1:
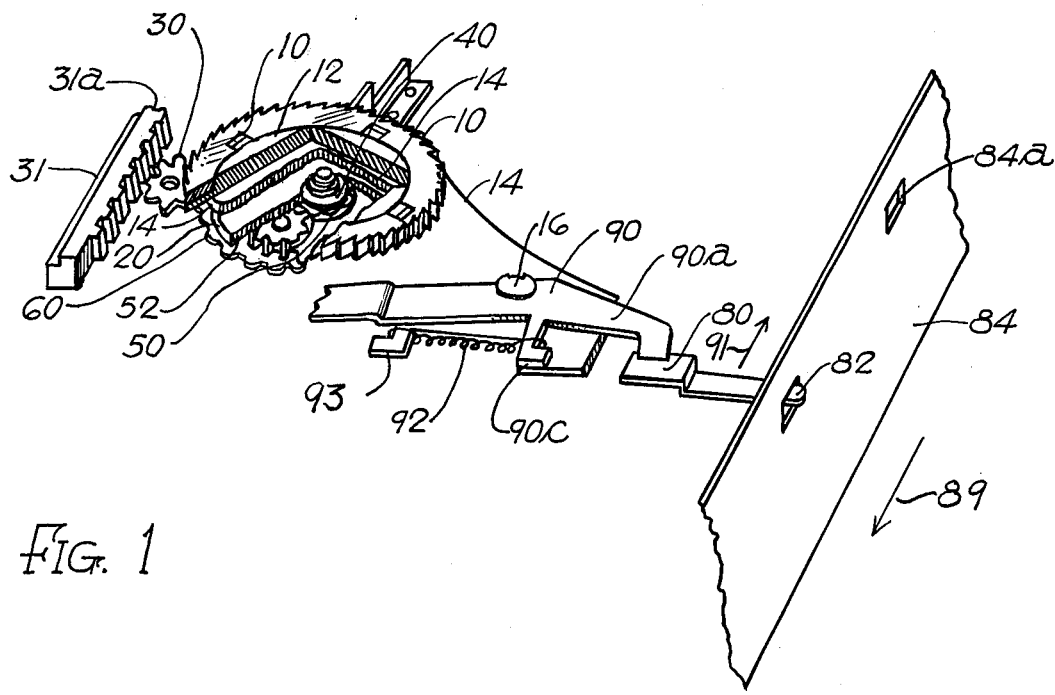
FIG. 1 is an enlarged fragmentary view in perspective of an embodiment of the film advancing mechanism of this invention mounted in operative relation to a film actuator and the film in a still camera.

Referring, now, in greater detail to FIGS. 1–5 of the drawings, the film advancing mechanism of the present invention includes a ratchet wheel 10 having a plurality of teeth 10a formed along its outer edge. The ratchet wheel 10 forms part of a slip clutch-forming assembly including also a locking detent-forming leaf spring 11 and a sun gear-carrying hub member 12 both held together for rotation by rivets 13—13. (While the broadest aspect of the invention is not limited to the use of two elements for such purpose, the leaf spring 11 and member 12 are referred to in the claims as rotatable means secured to the sun gear means. Similarly, the ratchet wheel forms part of what is referred to in the claims as rotation inhibiting means.) The hub member 12 has an annular seat 12a on which the ratchet wheel 10 is carried so that the hub member 12 can slide in centered relation therealong on the side thereof opposite to that on which the wheel 10 is supported. The hub member has an extension or shaft 12b having an inner cylindrical base or bearing receiving portion 12c and an outer, non-circular reduced gear receiving portion 12d.

The hub member 12 slides on a base plate 14 having an opening 14a through which the shaft 12b of the hub member 12 extends. The plate 14 supports a differential gear train assembly which includes a transmission or drive gear 20 having a centrally located opening 20a therethrough for receiving the non-circular base of a bearing receiving portion 12c of the shaft 12b on the hub member 12. The drive gear 20 is formed with a fan-like extension 20b along its periphery. The extension 20b has a plurality of teeth 20c which engage the teeth 30a of an actuating gear 30 mounted for rotation about a pin 32 (FIG. 3) and which may be driven by a rack 31 forming part of a manually reciprocable film winding lever or member, like the viewfinder carrying section of the camera housing disclosed in said U.S. Pat. No. 4,032,940.

The side of the drive gear 20 opposite to that which is in engagement with the base plate 14 is formed with a centrally located recess or seat 20d (FIG. 2B) and a pair of eccentric recesses or seats 20e—20e. The centrally located recess or seat 20d receives the head 40a of a bearing member 40 (FIG. 2) with a bore 40b therethrough. The member 40 is provided with a reduced cylindrical portion 40c which extends through the opening 20a in the gear 20 and the opening 14a in the base plate 14 into abutting relation to the hub member 12. The non-circular base portion 12c of the extension or shaft 12b of the hub member 12 extends through a corresponding non-circular bore 40b in the bearing member 40 and the non-circular reduced end 12e of the extension or shaft 12b is received in a corresponding non-circular opening in the sun gear 50 having external teeth 50a so that the gear 50, shaft 12b, hub member 12 and leaf spring 11 move together as a unit. The eccentric recesses or seats 20e—20e (FIG. 2B) are each provided with a centrally positioned pin or shaft 20f for receiving a pair of eccentric planetary gears 52—52 having external teeth 52a—52a which engage the teeth 50a of the sun gear 50.

Figure 3:
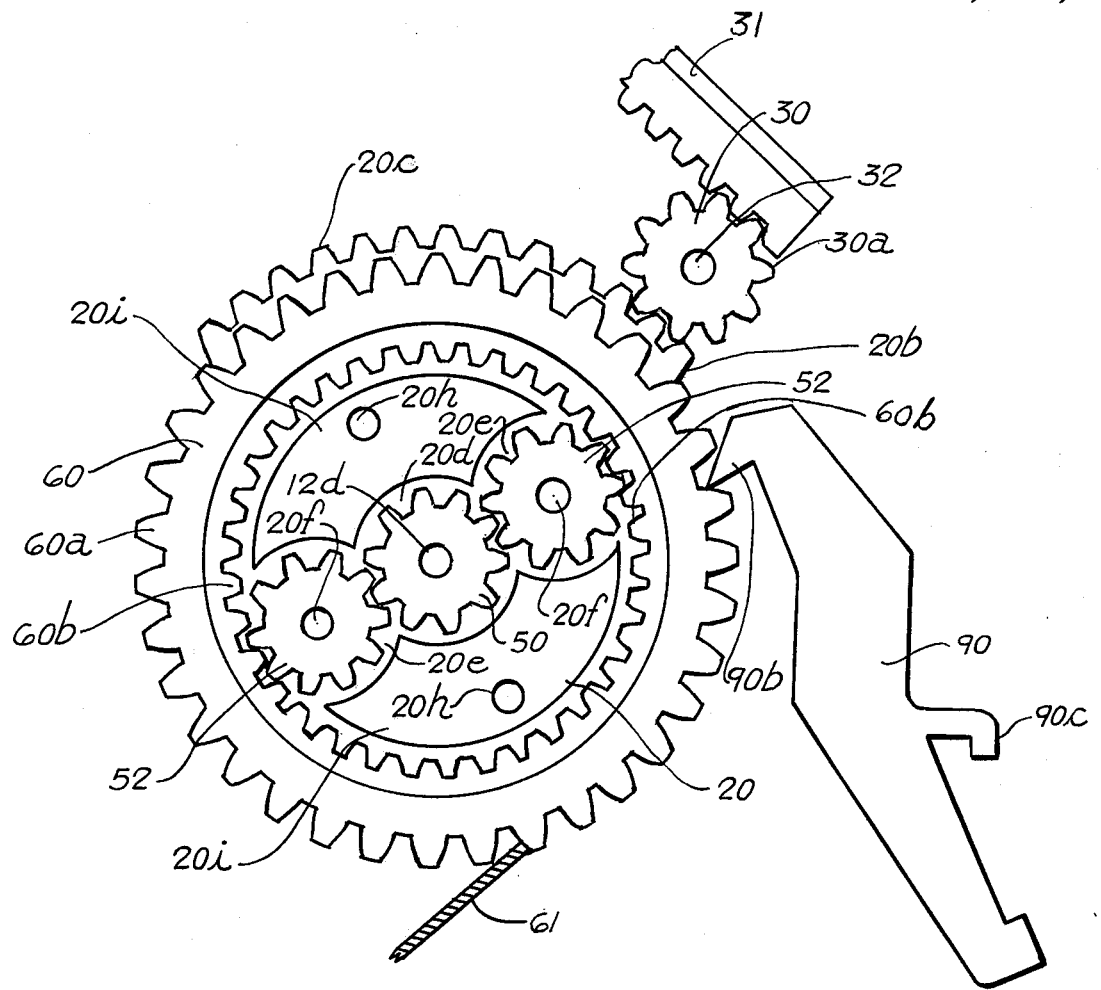
FIG. 3 is an enlarged plan view of the gear train of said embodiment of the mechanism as seen with the cover plate removed.

The same side of the drive gear 20 is provided with an annular recess or seat 20g for receiving an annular film winding gear 60 which is held against counter-clockwise rotation by a locking pawl 61 (as viewed in FIGS. 2 and 3). The gear 60 has a plurality of outer teeth 60a and a plurality of inner teeth 60b. The outer teeth 60a are adapted to engage the teeth of a gear in a film cartridge or cassette (not shown) and to effect a film winding operation when moved in a clockwise direction. The inner teeth 60b of the gear 60 engage the teeth 52a—52a of the planetary gears 52—52. The elements of the gear assembly carried on the drive gear 20 are maintained in position by a cover plate 62 having countersunk bores 62a—62a therethrough for receiving screws 64 which are engaged in tapped bores 20h—20h formed in the raised portions 20i—20i of the drive gear 20.

Figure 5:
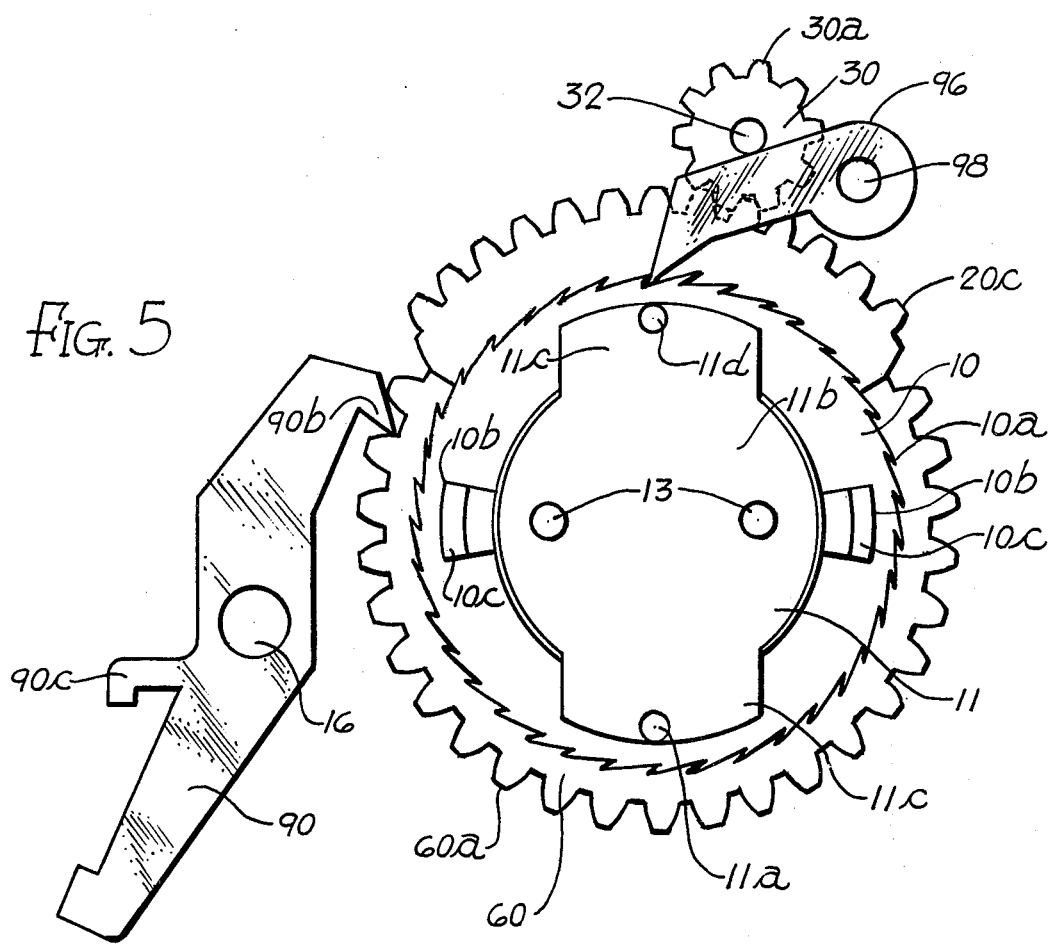
FIG. 5 is an enlarged plan view of said embodiment of the mechanism as viewed from the end thereof opposite to that shown in FIG. 3.
Figure 4:
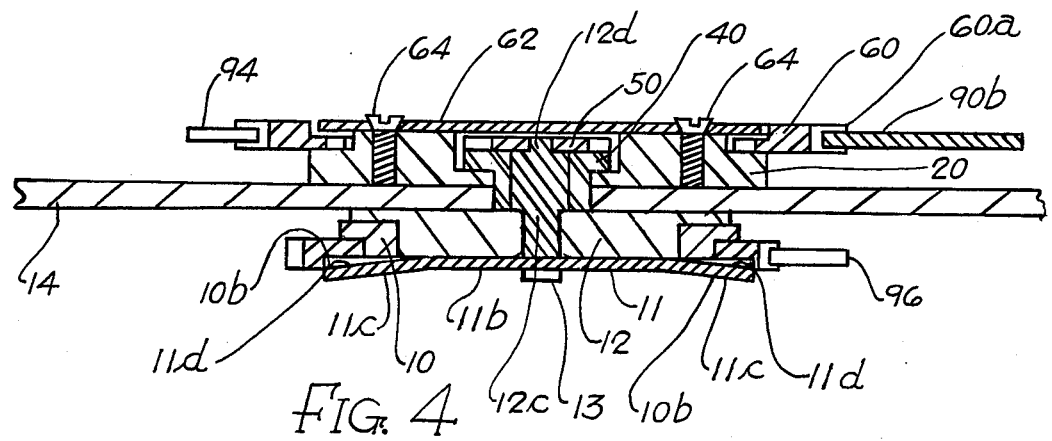
FIG. 4 is an enlarged sectional view of said mechanism.

Referring, again, in particular, to FIGS. 2, 4 and 5 of the drawings, the ratchet wheel 10 is prevented from rotation in a clockwise direction by a spring urged locking pawl 96. Also, it has two detent-receiving pairs of recesses or notches 10b—10b formed therein. Each pair of recesses 10b—10b are diametrically opposed to one another, and each recess is provided with a detent engaging surface 10c. The leaf spring 11 is provided with openings 11a—11a through the main body portion 11b thereof, and the shanks of rivets 13—13 are anchored in openings 12d—12d in the hub member 12. Joined to opposite sides of the main body portion 11b of the leaf spring 11 are outwardly extending, slightly upwardly bent ratchet wheel engaging portions 11c—11c each of which is provided with a button or detent 11d adapted to engage the surfaces 10c—10c of the pairs of recesses or slots 10b—10b formed in the ratchet wheel 10, and the abutment shoulders formed at the ends of the recesses. In the course of a film winding operation, the forces acting on the ratchet wheel 10 will tend to move the ratchet wheel in a clockwise direction, but such movement is prevented by the spring urged locking pawl 96 which engages the teeth 10a thereof. Normally, the detents 11d—11d of the leaf spring 11 are and remain in the ratchet wheel recesses 10b—10b. When the annular gear 60 is unlocked, the sun gear 50 carried by the hub member 12 will be effectively locked in place because the sun gear carrying hub member will be held from movement by the detents 11d—11d located in the ratchet wheel recesses until the annular gear becomes locked in position at the end of a film winding operation. When this occurs, the continued rotation of the drive gear 20 will force the detents 11d—11d in a film winding direction out of the ratchet wheel recesses 10b to permit continued movement of the drive gear 20. When the drive gear 20 is moved in the opposite direction by the return movement of the manually operable film winding member, (which is the viewfinder carrying section of the camera disclosed in said U.S. Pat. No. 4,032,940), detents 11d—11d will once again enter a pair of the ratchet wheel recesses 10b—10b and the ratchet wheel 10 and the sun gear carrying hub member 12 will then move together since the ratchet wheel is now moved in the unlatched or counter-clockwise direction and so slips by the spring urges locking pawl 96. (It should now be apparent that the abutment shoulders at the opposite ends of the ratchet wheel recesses hold the sun gear-carrying hub member 12 stationary during a film winding operation, and catch the detents to properly reposition the sun gear-carrying hub member during the return of the manually operable film winding member to its initial starting position.) When the sun gear 50 is free to rotate, the force applied to move the drive gear 20 is not imparted to the locked annular gear.

To summarize the operation of the planetary gear train just described (comprising the annular film winding gear 60, the sun gear 50a and eccentrically mounted on planetary gears 52a—52a), when the drive gear 20 carrying the planetary gears 52a—52a is rotated in one direction or the other by movement of the aforementioned rack 31 in one direction or the other, planetary gears 52a—52a carried by the drive gear 20 are bodily moved along an arc displaced from the axis of rotation of the planetary gear train. When the sun gear 50 is locked against rotation, the bodily rotation of the planetary gears 52a—52a will impart rotation to the annular gear 60 if the annular gear is free to rotate. The ratchet pawl 61 engages the annular gear 60 to permit its rotation only in a clockwise direction, which is the film winding direction of movement thereof. When the annular gear 60 is locked against rotation, the movement of the drive gear 20 and the planetary gears 52a—52a carried thereby is permitted by the fact that the sun gear carrying hub member 12 is free to rotate in the manner previously described. The annular gear 60 is locked against clockwise rotation when the film has been completely unwound from a supply spool to which it is attached, or when a film sensing pawl, like pawl 82 in FIG. 1 enters an aperture in the film at the end of a normal film winding operation.

As indicated previously herein, in the camera such as is disclosed in U.S. Pat. No. 4,032,940, film indexing a distance of one frame is achieved during each one time movement of the viewfinder carrying section of the camera from a fully retracted to a fully extended position. A film winding operation terminates when a sensing finger 80 as shown in FIG. 1 having a sensing and arresting pawl 82 enters a film metering perforation 84a and is moved a short distance by an edge of a film metering perforation 84a in the film 84. In the camera shown, the film sensing finger 80 is provided with means for engaging an extension 90a joined to the locking pawl lever 90. The lever 90 is mounted for rotation on the plate 14 by a pin 16, and has at its other end the pawl 90b for engaging the outer teeth 60a of the annular gear 60. A pair of spaced, hook-shaped retaining posts 90c-90b are respectively provided on the plate 14 and the lever 90 for receiving the ends of a compression spring 92 which acts to normally urge the pawl 90b in a direction to engage with the teeth 60a of the gear 60 when permitted to do so. However, except when the pawl 82 of the film sensing finger 80 is positioned within a film metering aperture 84a and is moved by the film a short distance in the direction shown by the arrow 89 in FIG. 1, the lever 90 is held by the force of springs (not shown) acting on the film sensing finger in the direction shown by arrow 91 so that it cannot assume a gear locking position where the locking pawl 90b thereof makes engagement with the annular gear 60. As is commmon with sensing fingers in still cameras of the 126 and 110 film-receiving size, the film sensing finger 80 is supported so that it can move parallel as well as laterally of the length thereof. The film sensing finger pawl 82 is withdrawn from a film metering aperture after a picture is taken when the film winding member (i.e. the viewfinder carrying section in the camera being described) is returned to its fully retracted or initial position. When the film sensing pawl 82 is so removed, it then bears against the film, and after it again enters a film metering aperture 84a and is moved slightly in the direction of the arrow 89 following completion of a film winding operation, the film sensing finger 80 loses contact with an abutment tab 90d on the lever 90, so that the spring 92 is effective in moving the locking pawl 90b against the annular gear 60 to lock the same against further rotation, as previously indicated.

After the annular gear 60 is locked in place during a partial movement of the manually operable film winding member involved from its initial retracted to its fully extended position, further outward movement of this member is permitted because, with the annular gear 60 locked in place, the locking detents 11d—11d of the leaf spring 11 can be readily forced out of the ratchet wheel holding recesses 10b—10b in which they are located by a modest force applied to this manually operable film winding member. Upon return of the manually operable film winding member to its initial position, as previously explained, the detents 11d—11d will again enter a pair of the holding recesses 10b—10b, whereupon the ratchet wheel 10 then moves with the leaf spring and sun gear carrying member 12 as the spring urged locking pawl 96, which creates only a small opposition to movement of the ratchet wheel in a counter clockwise direction, slips over the rotating ratchet wheel.

If the user of the camera during an apparent film winding operation is unaware of the fact that the end of the roll of film has been reached, as he attempts to advance the film another frame distance the film then acts as a lock on further rotation of the annular gear, and locking detents 11d—11d will slip out of the ratchet wheel recesses without imparting a force which will tear the film from the supply spool.

While the film advancing mechanism has been described in relation to its preferred utilization of a retractable camera of the type disclosed in U.S. Pat. No. 4,032,940, it should be understood that various modifications may be made in the preferred embodiment of the mechanism as described to adapt it for use in other cameras without deviating from the broader aspects of the invention.

We claim:

1. In a camera which includes means for receiving film with metering perforations therein spaced one frame distance apart, and rotatable film winding means for imparting movement to said film and rotatable in a film winding direction unless locked against rotation in such direction, said camera further including a film perforation sensing member movably urged toward the path of movement of the film metering perforations of said film, a manually operable means mounted on the camera for movement in a film winding direction and locking means responsive to the entry of said sensing member into a film perforation for locking said film winding means for movement in said film winding direction, the improvement comprising: film advancing and slip clutch mechanism on said camera and coupled between said manually operable means and said film winding means, said film advancing and slip clutch mechanism comprising first rotatable means rotated respectively in at least a first direction when said manually operable means is operated in one direction, said film winding means being an annular gear means rotatable in a film winding direction and having internal teeth and a portion thereof to be coupled to said film, eccentrically mounted gear means pivoted upon and carried by said first rotatable means at a point spaced from the axis of rotation of said annular gear means and engaging said internal teeth of said annular gear means, sun gear means meshing with said eccentrically mounted gear means, said eccentrically mounted gear means when said first rotatable gear means is driven being rotated in non-driving relationship to the internal teeth of said film winding gear means when said sun gear means rotates and being rotated in driving relationship therewith to effect a film winding operation when said sun gear means is held against rotation, and slip clutch-forming means including rotatable means secured to said sun gear means and rotation inhibiting means engaging the latter rotatable means, said inhibiting means being responsive to the unhindered rotation of said film winding means by holding said latter rotatable means and the sun gear means connected thereto stationary and responsive to the positive locking of said film winding means by either said locking means or the inability of the film to be advanced any further by permitting said latter rotatable means to slip by said rotation inhibiting means.

2. The camera of claim 1 wherein said latter rotatable means of said slip clutch-forming means includes detent means engageable with shoulders on said rotation inhibiting means which detent means slips by said shoulders when said film winding means is positively locked in position.

3. The camera of claim 2 wherein said detent means is carried by resilient means which readily passes by said shoulders when the film winding means has been locked into position to minimize tearing forces on the film when the film cannot be advanced any further.

4. In a camera which includes means for receiving film with metering perforations therein spaced one frame distance apart, and rotatable film winding means for imparting movement to said film and rotatable in a film winding direction unless locked against rotation in such direction, said camera further including a film perforation sensing member movably urged toward the path of movement of the film metering perforations of said film, a manually operable reciprocable means mounted on the camera for movement between an initial position and extended position, and locking means responsive to the entry of said sensing member into a film perforation for locking said film winding means for movement in said film winding direction, the improvement comprising: film advancing and slip clutch mechanism on said camera and coupled between said reciprocable means and said film winding means, said film advancing and slip clutch mechanism comprising first rotatable means rotated respectively in first and second directions when said manually operable reciprocable section means is reciprocated in one direction and the other between said initial and extended positions, said film winding means being an annular gear means rotatable in only a film winding direction and having internal teeth and a portion thereof to be coupled to said film, eccentrically mounted gear means pivoted upon and carried by said first rotatable means at a point spaced from the axis of rotation of said annular gear means and engaging said internal teeth of said annular gear means, sun gear means meshing with said eccentrically mounted gear means, said eccentrically mounted gear means when said first rotatable gear means is driven being rotated in non-driving relationship to the internal teeth of said film winding gear means when said sun gear means rotates and being rotated in driving relationship therewith to effect a film winding operation when said sun gear means is held against rotation, and slip clutch-forming means including rotatable means secured to said sun gear means and rotation inhibiting means engaging the latter rotatable means, said inhibiting means being responsive to the free rotation of said film winding means by holding said latter rotatable means and the sun gear means connected thereto stationary and responsive to the positive locking of said film winding means by either said locking means or the inability of the film to be advanced any further by permitting said latter rotatable means to slip by said rotation inhibiting means.

5. The camera of claim 4 wherein said latter rotatable means of said slip clutch-forming means includes detent means engageable with shoulders on said rotation inhibiting means which detent means slips by said shoulders when said film winding means is positively locked in position.

6. The camera of claim 5 wherein said detent means is carried by resilient means which readily passes by said shoulders when the film winding means has been locked into position to minimize tearing forces on the film when the film cannot be advanced any further.

7. The camera of claim 4, 5 or 6 wherein said rotation inhibiting means has at least one recess forming said shoulders at the ends thereof which shoulders are respectively engaged by said detent means in the opposite directions of movement of said detent means relative to said rotation inhibiting means, locking means for holding said rotation inhibiting means from any movement and holding said sun gear connected rotatable means in place when said detent means engages one of the shoulders formed by said recess during a film winding operation, and said rotation inhibiting means being movable by said detent means when the other shoulder of said recess is engaged by said detent means when the manually operable reciprocable means is moved in the opposite direction to that which effects a film winding operation.

8. The camera of claim 7 wherein said rotation inhibiting means is a ratchet wheel, and there is provided pawl means spring-urged against ratchet teeth on the periphery of said ratchet wheel so as to lock said ratchet wheel against rotation in one direction and to permit the ratchet wheel to remain stationary until said detent means engages a shoulder thereon when said manually operable reciprocal means is moved in said opposite direction, whereupon said detent means imparts movement to said rotation inhibiting means so that the detent means remains in said recess.

* * * * *